United States Patent

[11] 3,632,314

[72] Inventor Samuel L. Torrence
 Charleston, S.C.
[21] Appl. No. 18,353
[22] Filed Mar. 10, 1970
[45] Patented Jan. 4, 1972
[73] Assignee Westvaco Corporation
 New York, N.Y.
 Continuation-in-part of application Ser. No. 752,298, Aug. 13, 1968, now Patent No. 3,563,704. This application Mar. 10, 1970, Ser. No. 18,353

[54] REGENERATION OF SULFURIC ACID LADEN ACTIVATED CARBON
 3 Claims, No Drawings
[52] U.S. Cl..................................................... 23/224, 23/226, 55/73
[51] Int. Cl...................................................... C01b 17/04
[50] Field of Search............................................23/224–226, 181, 2.1; 55/73

[56] References Cited
 UNITED STATES PATENTS
 1,955,722 4/1934 Ahlqvist.................... 23/226

| 2,123,224 | 7/1938 | Baehr et al................... | 23/226 |
| 2,756,127 | 7/1956 | James et al................... | 23/225 X |
| 2,839,365 | 6/1958 | Murray......................... | 23/224 X |
| 3,284,158 | 11/1966 | Johswich...................... | 23/225 X |
| 3,454,354 | 7/1969 | Kerr............................. | 23/225 X |

FOREIGN PATENTS 749,940 1/1967 Canada........................ 23/178

Primary Examiner—Oscar R. Vertiz
Assistant Examiner—G. O. Peters
Attorneys—Ernest B. Lipscomb and Robert S. Grimshaw ABSTRACT: A two-stage process for regenerating sulfuric acid laden activated carbon by contacting at a temperature below about 350° F. the activated carbon with hydrogen sulfide in an amount of at least 3:1 mole ratio of hydrogen sulfide to adsorbed sulfuric acid whereby the sulfuric acid is reduced to elemental sulfur which remains adsorbed on the activated carbon. The sulfur is then removed from the activated carbon in a second stage by contacting with a sulfur-reducing gas, such as hydrogen to produce a sufficient amount of hydrogen sulfide for use in the first step and the remaining sulfur is recovered.

REGENERATION OF SULFURIC ACID LADEN ACTIVATED CARBON

This application is a continuation-in-part of copending U.S. application Ser. No. 752,298, now U.S. Pat. No. 3,563,704.

BACKGROUND OF THE INVENTION

This invention relates to a process for removing sulfur oxides from oxygen-containing gas streams by adsorption onto a carbonaceous absorbent and recovering sulfur from the regenerated adsorbent. More specifically, this invention relates to an improved process for regenerating sulfuric acid laden activated carbon by contacting with hydrogen sulfide so as to reduce all of said sulfuric acid to sulfur.

Many industrial plants employ fuels having a sulfur content as high as 3 percent or more. These fuels, primarily coal and fuel oil, upon combustion, form undesirable pollutants, including sulfur oxides. Removal of these sulfur oxides from effluent gas streams has long been a troublesome problem. The economic advantages of this invention enable industrial plants to use high sulfur content fuels without fear of air pollution. In addition, other industrial effluents, such as those from pulp mills, contribute to sulfur oxide pollution. For purposes of this invention, "sulfur oxides" are herein defined to include both sulfur trioxide and sulfur dioxide. The presence of these sulfur oxides in waste gases passed into the atmosphere results in considerable amounts of pollution.

The removal of sulfur oxides from flue gases may be achieved by chemical or physical processes, using liquid or solid substances. The most successful combinations of these processes are wet scrubbing with liquids and dry methods which employ contacting with solid substances. The objective of all the processes is to prevent the emission of the noxious and offensive sulfur oxide gases into the atmosphere. Wet scrubbing lowers the temperature of the gas stream to that of the washing water, which is considerably lower than the temperature necessary to retain the buoyancy necessary to disperse the emission over a wide area. In contrast, dry processes have the advantage over wet processes of maintaining a high emission temperature.

Many of the dry processes contact adsorbent material with the gases to be cleaned. In order to keep the adsorbent inventory at a minimum the adsorbent must have a high adsorbing efficiency, if the plant is not to be excessively large. In addition, the adsorbent must be relatively hard with minimum attrition; most importantly, the adsorbent must be easily and inexpensively regenerated. Included among the several dry processes that have been developed are a catalytic oxidation process (U.S. Pat. No. 3,318,662), a manganese nodule process (U.S. Pat. No. 3,330,096), an alkalized alumina process, (U.S. Pat. No. 2,992,884) and activated char processes (U.S. Pat. No. 2,992,895 and 2,992,065). One of the major costs in these dry processes is the charge for material used to regenerate the adsorbent by reacting with the adsorbed sulfur oxides. For instance, in the activated char process the reactant is the carbonaceous adsorbent itself. One of the principal disadvantages of these processes, particularly the activated char process, is the expensive regenerating costs.

The activated char process removes sulfur oxides from a gas stream by using a carbonaceous adsorbent, such as an activated char, long recognized as a good adsorbent. In this process the activated char catalytically oxidizes sulfur dioxide to sulfur trioxide which is adsorbed as such, or is combined with water vapor to form sulfuric acid, which adheres tightly to the surfaces of the activated char. In the normal combustion of fuels there are present in the flue gas amounts of oxygen and water in excess of that needed to carry out the oxidation of sulfur dioxide and the hydration of the resulting sulfur trioxide to form sulfuric acid. The sulfuric acid laden char is then regenerated at temperatures above 300° C., whereupon the sulfuric acid splits into water and sulfur trioxide, the latter being reduced to sulfur dioxide with the carbonaceous adsorbent serving as a reducing agent. One of the disadvantages of this process is that the carbonaceous adsorbent is used as the reducing agent, therefore large losses of adsorbent, known as "burn-off," occur. Regeneration is carried out according to the following reaction:

[1] $H_2SO_4 + carbon \rightarrow SO_2 + \frac{1}{2} CO_2 + H_2O$

Consumption of an activated carbon at the rate needed for regeneration according to reaction [1], i.e., about 0.1 pounds of carbon per pound of sulfur dioxide recovered, is economically unattractive. Because of the necessity of replacing a substantial portion of the adsorbent with each adsorption and regeneration cycle, it is necessary that an inexpensive "char" be employed. These chars generally have poor rate and capacity characteristics necessitating large adsorber sizes to compensate for these poor characteristics. Another disadvantage is that the inexpensive char, which has a low hardness, becomes structurally weaker and more subject to attrition as a result of burn-off during regeneration.

It is a general object of this invention to provide a process for regenerating a carbonaceous adsorbent having sulfur oxides adsorbed thereon in the form of sulfuric acid without consuming the adsorbent. A more specific object is to provide a continuous process for removing sulfur dioxide and sulfur trioxide from flue gases whereby these oxides are adsorbed onto activated carbon as sulfuric acid and the sulfuric acid laden activated carbon is contracted with hydrogen sulfide so as to reduce the adsorbed sulfuric acid to sulfur without burn-off losses. Another object is to provide a two-stage process for regenerating sulfur acid laden activated carbon by sequentially contacting the activated carbon with hydrogen sulfide to reduce the sulfuric acid to sulfur and then with a sulfur-reducing gas to remove sulfur from the adsorbent. A further object is to provide a process for sequential removal of sulfur trioxide and sulfur dioxide, thereby permitting the gas stream to pass to the atmosphere essentially free from sulfur oxide pollution. Further objects, features and disadvantages of this invention will be evident from the following disclosure.

SUMMARY OF THE INVENTION

It has been found that removal of adsorbed sulfuric acid from a carbonaceous adsorbent may be accomplished in a two-stage process without significant carbon burn-off by first contacting at a temperature below 350° F. the carbonaceous adsorbent with hydrogen sulfide in an amount of at least 3:1 molar ratio of hydrogen sulfide to sulfuric acid to reduce the sulfuric acid to elemental sulfur which remains adhered to the adsorbent. The carbonaceous adsorbent having sulfur adsorbed thereon is then contacted in a second stage with a sulfur-reducing gas, such as hydrogen, to convert a sufficient amount of the adsorbed sulfur to hydrogen sulfide for use in the first stage of regeneration. The remaining sulfur is vaporized and recovered as a byproduct and the completely regenerated adsorbent is then recycled to the sulfur oxide adsorber. Since regeneration is accomplished without carbon burn-off, it has been found that the use of this preferred process allows utilization of a hard granular carbon having superior adsorption rate and capacity characteristics and a low attrition rate as the adsorbent.

DETAILED DESCRIPTION OF THE INVENTION

The sulfur oxide laden flue gas is passed countercurrent to the continuously moving carbon adsorbent and the sulfur oxides are adsorbed therefrom as sulfuric acid. The sulfur oxide removal efficiency of the process can be designed to be as high as required, for example, the gas stream as it passes to the atmosphere may be reduced to less than 5 p.p.m. of sulfur from an initial concentration of 1,000 to 50,000 p.p.m. However, for economic reasons, it is usually preferable to adsorb about 90 percent of the sulfur oxides from the gas stream.

Physical adsorption of sulfur dioxide by activated carbon at flue gas temperatures is very low, but sulfur trioxide by comparison is readily adsorbed. Consequently, satisfactory removal from the gas stream depends upon the activated carbon acting as a catalyst in the oxidation of sulfur dioxide to sulfur trioxide which is hydrolyzed to sulfuric acid if water vapor is present in the flue gas. The oxygen and water vapor necessary for the reaction are normally present in the flue gas, but may be added if desired. The sulfuric acid thus formed adheres to the carbon surface and in this manner sulfur oxides are removed from the gas stream.

[2]
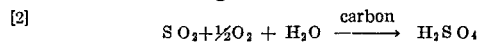
$$SO_2 + \tfrac{1}{2}O_2 + H_2O \xrightarrow{\text{carbon}} H_2SO_4$$

One of the advantages of an activated carbon process is that sulfur oxide removal may be performed at flue gas temperatures. Consequently, adsorption of sulfur oxides may take place at temperatures up to about 350° F. The preferred temperature for adsorbing both sulfur dioxide and sulfur trioxide is between 200° F. and 260° F. However, in adsorber units where corrosion by sulfur trioxide is a problem, the adsorption of sulfur oxides may be performed sequentially, using a single carbonaceous adsorbent so as to first adsorb the sulfur trioxide while it is at a temperature above its dewpoint and then to oxidize and adsorb the sulfur dioxide.

Any carbonaceous adsorbent may be used in the process of this invention, but an activated carbon is preferred. Since the regeneration procedure does not consume the activated carbon adsorbent, a highly activated, more effective hard carbon, such as those disclosed in my copending application Ser. No. 734,566, may be used. Through the ability to use the more highly activated carbons, the throughput of gas per volume of carbon can be increased by five to seven times more than the throughput of activated char. This achievement means a significant reduction in the size of the adsorption equipment required for a sulfur dioxide recovery process. In addition, hard activated carbons are much less subject to abrasion than are chars, the result being lower attrition losses.

The essence of this invention is that regeneration may be efficiently carried out by using at least a 3:1 molar ratio of hydrogen sulfide to adsorbed sulfuric acid in stage one. The stoichiometry is described by the following reactions.

[3]
$$H_2SO_4 + 3H_2S \xrightarrow{\text{activated carbon}} 4S + 4H_2O$$

The carbon burn-off during these regenerations is negligible. All of the adsorbed sulfuric acid and hydrogen sulfide are converted to elemental sulfur which remains adsorbed on the activated carbon surface. It is believed that the carbon acts as a catalyst not only to the adsorption of sulfur oxides but in the regeneration as well. The regeneration may be started at ambient temperature and should be kept at temperatures below 350° F. for reaction [3] to occur and sulfur remain adsorbed on the carbon. As the temperature is raised above 350° F. a reaction favoring the formation of sulfur dioxide occurs.

The carbonaceous adsorbent having sulfur adhered to its surface is carried to the second stage of regeneration to remove the adsorbed sulfur. The adsorbed sulfur may be removed by a variety of sulfur-reducing gases, but the preferred gas is hydrogen and the reaction is:

[4]
$$3H_2 + 4S \xrightarrow{\text{activated carbon}} 3H_2S + S$$

Three moles of hydrogen sulfide per mole of sulfuric acid are required in stage one; therefore, 3 moles of hydrogen are fed into stage two. The remaining mole of sulfur vapor is purged from the carbon by the hot gases in stage two and condensed as a byproduct for sale. The hydrogen sulfide formed by reaction [4] is carried to the first stage of regeneration for use in reaction [3]. The thus completely regenerated carbon is then recycled without any loss in effectiveness for adsorption of sulfur oxides. It is desirable to carry out reaction [4] at temperatures above 500° F. Further, it has been found that temperatures between 800° F. and 1,300° F. are particularly satisfactory for removing the sulfur at a sufficiently short reaction time, but lower temperatures may be used if sufficient reaction time is allowed.

The complete regeneration is preferably conducted in two stages by first a chemical reduction of adsorbed sulfuric acid to elemental sulfur by hydrogen sulfide, and secondly the reaction of the elemental sulfur with hydrogen to form hydrogen sulfide. Thus the hydrogen sulfide which is required for reduction of sulfuric acid in reaction [3] is formed within the system by reaction of adsorbed sulfur with hydrogen. Examination of the chemistry shown below reveals that the overall regeneration can be summarized as a hydrogen reacting with sulfuric acid to produce sulfur.

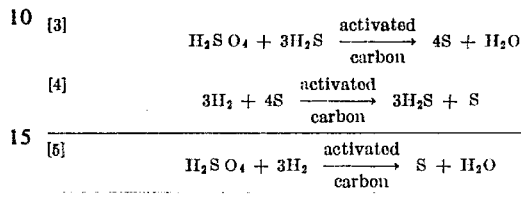

[3]
$$H_2SO_4 + 3H_2S \xrightarrow{\text{activated carbon}} 4S + H_2O$$

[4]
$$3H_2 + 4S \xrightarrow{\text{activated carbon}} 3H_2S + S$$

[5]
$$H_2SO_4 + 3H_2 \xrightarrow{\text{activated carbon}} S + H_2O$$

The advantages offered by this invention include the ability to use a process whereby burn-off of activated carbon may be virtually eliminated. A second advantage is the ability to use a carbon possessing superior absorption rate and capacity characteristics. Regeneration by chemical reduction has the further advantage of producing a stream concentrated in gaseous sulfur which can be condensed to liquid sulfur. Another important consideration is that elemental sulfur can now be recovered directly without an external reactor such as a Claus unit as needed in the earlier described processes. The adsorption and regeneration may be carried out in a fixed bed system or a continuously moving bed system, but the preferred process utilizes a fluidized bed system. For the purpose of the invention the terms "absorbed sulfuric acid" and "sulfuric acid laden" are construed to also include small amounts of adsorbed sulfur trioxide.

The practice of this invention may clearly be seen in the following example.

To evaluate the feasibility of the process of this invention an activated carbon was saturated with sulfuric acid by adsorbing sulfur dioxide from the gas stream having the following composition:

| Component | Percent by Volume |
|---|---|
| $SO_2$ | 0.3 |
| $O_2$ | 3.4 |
| $H_2O$ | 6.9 |
| $CO_2$ | 11.6 |
| $N_2$ | 77.8 |

The carbon was loaded with 12 grams of sulfur dioxide per 100 grams of carbon. Adsorption was carried out in a 1-inch diameter cylindrical adsorber charged with 100 cc. of a hard granular carbon in a fixed bed. The gas stream was passed downward through the carbon bed at a temperature of 203° F. and a space velocity of 2,000 bed volumes of gas per hour.

Regeneration was carried out by exposing the sulfuric acid laden activated carbon to a stream of hydrogen sulfide gas at a concentration of 36 percent in a helium carrier. The helium was used as a carrier to simplify analytical procedures, but in practice any inert gas would be suitable. The regeneration was begun at ambient temperature with the temperature increasing steadily to 300° F. in 150 minutes. The space velocity was 120 bed volumes of gas per hour. The effluent gas stream was monitored for $SO_2$, $H_2S$, CO and $CO_2$. The amounts of gases were measured quantitatively and the amounts CO and $CO_2$ in the effluent gas stream were used to determine the amount of carbon burn-off. Analysis for CO and $CO_2$ showed that carbon burn-off was about 0.02 percent of the carbon adsorbent. Analysis of the effluent stream showed that 98.6 percent of the adsorbed sulfuric acid was converted to elemental sulfur.

The activated carbon adsorbent having elemental sulfur adsorbed thereon was then passed to the second stage of regeneration were it was contacted with hydrogen gas starting at ambient temperature and increasing to 1,150° F. in 180 minutes. The space velocity was 145 bed volumes of gas per hour or a gas contact time of approximately 4 seconds at 1,150° F. An analysis of the effluent gas stream showed the hydrogen reacted with the sulfur according to reaction [4] to form hydrogen sulfide and gaseous sulfur, thus removing substantially all of the sulfur from the carbon. The carbon burn-off was negligible.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

I claim:

1. In a process for removing sulfur dioxide and sulfur trioxide from a flue gas stream by adsorbing onto activated carbon as sulfuric acid and regenerating, the improvement in regenerating comprising;
    a. contacting said sulfuric acid laden activated carbon with at least 3 moles of hydrogen sulfide per mole of adsorbed sulfuric acid at a temperature below 350° F. to convert substantially all of said adsorbed sulfuric acid and hydrogen sulfide to elemental sulfur and water vapor,
    b. heating said activated carbon with 3 moles of a sulfur-reducing gas at a temperature between 800° F. and 1,300° F. to reduce said elemental sulfur to 3 moles of hydrogen sulfide and 1 mole of vaporous elemental sulfur,
    c. recovering said vaporous elemental sulfur,
    d. using the hydrogen sulfide produced in step (b) to reduce said adsorbed sulfuric acid in step (a) and
    e. recycling said activated carbon.

2. The process of claim 1 wherein said carbonaceous adsorbent is a coal-based activated carbon.

3. The process of claim 1 wherein said sulfur-reducing gas is hydrogen.

* * * * *